United States Patent [19]

Smith

[11] 4,435,238

[45] Mar. 6, 1984

[54] MANUFACTURING PROCESS FOR A LOW LOSS OPTICAL FIBER CABLE

[75] Inventor: John C. Smith, Roanoke, Va.

[73] Assignee: International Telephone and Telegraph Corporation, New York, N.Y.

[21] Appl. No.: 437,392

[22] Filed: Oct. 28, 1982

[51] Int. Cl.³ .................. B65H 81/02; G02B 5/14
[52] U.S. Cl. ..................... 156/171; 156/172; 156/195; 156/292; 350/96.23
[58] Field of Search ............. 350/96.23, 96.24; 156/172, 171, 53, 178, 433, 183, 205, 210, 290, 293, 292, 425, 429, 195, 443; 427/207.1; 428/343, 182, 176, 173; 138/121; 174/126 CS, 70 R

[56] References Cited

U.S. PATENT DOCUMENTS

| | | | |
|---|---|---|---|
| 4,028,081 | 6/1977 | Marcatili | 65/2 |
| 4,090,902 | 5/1978 | Ferrentino | 156/177 |
| 4,153,332 | 5/1979 | Longoni | 350/96.23 |
| 4,155,963 | 5/1979 | de Vecchis | 264/1 |
| 4,235,511 | 11/1980 | Yonechi | 350/96.23 |
| 4,389,088 | 6/1983 | Trezequet | 350/96.23 |

FOREIGN PATENT DOCUMENTS 56-19007  2/1981  Japan ................. 350/96.23

Primary Examiner—Edward C. Kimlin
Assistant Examiner—Ramon R. Hoch
Attorney, Agent, or Firm—John T. O'Halloran; Robert P. Seitter

[57] ABSTRACT

A strength member is paid off from a neutralizer payoff in such a manner that the strength member is rotating. A tape having longitudinal grooves is paid off from a fixed payoff and passed through a forming die. The strength member is also passed through the forming die, and the tape is there applied to the exterior of the strength member. As a result of the rotation of the strength member, the tape obtains a helical lay about the strength member. An optical fiber is paid off from a neutralizer payoff and laid into a groove on said tape. An outer tape may be helically laid over the corrugated tape and a filling compound may be applied under and over the grooves of the corrugated tape. A binder may be provided to secure the outer tape over the fiber.

11 Claims, 5 Drawing Figures

U.S. Patent        Mar. 6, 1984        4,435,238
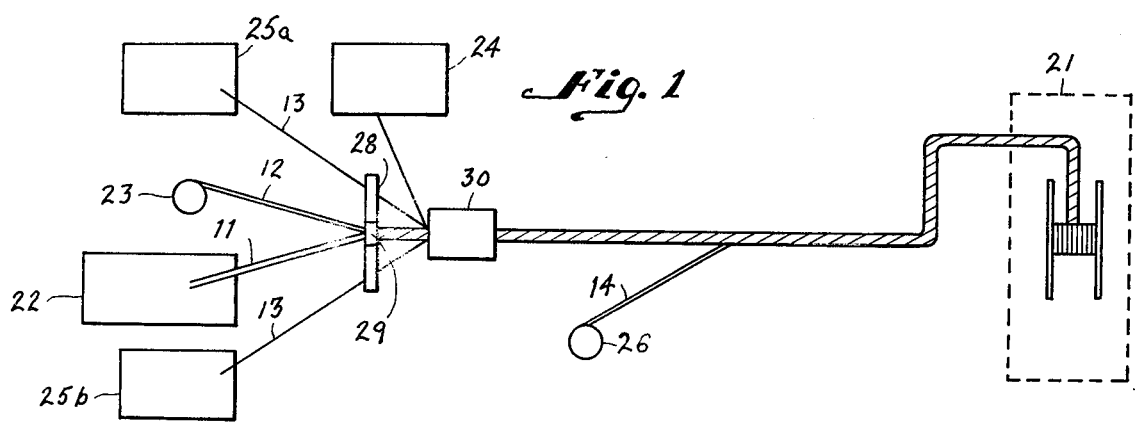
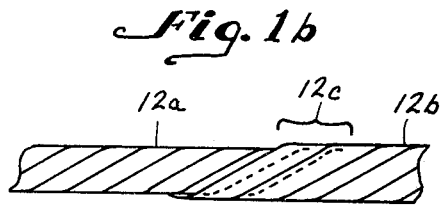
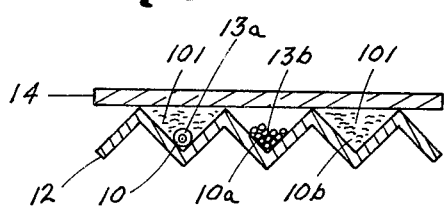
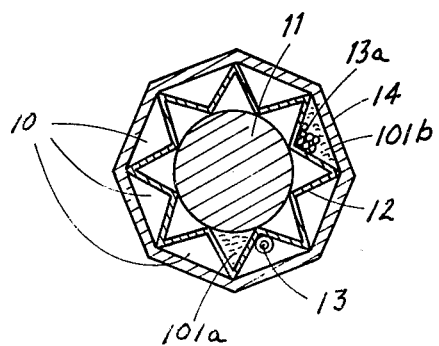

MANUFACTURING PROCESS FOR A LOW LOSS OPTICAL FIBER CABLE

FIELD OF THE INVENTION

The present invention relates to a method of manufacturing an optical fiber cable. More particularly, the present invention relates to a method of manufacturing an optical fiber cable of the type having a central strength member and one or more optical fibers laid about the central strength member in a protected manner.

BACKGROUND OF THE INVENTION

Optical fibers have become a desirable information transmitting medium due to their broad bandwidth capacity and small physical size and weight relative to metal electrical conductors. A number of characteristics of optical fibers including their susceptibility to breakage and their bending and stress losses pose serious problems in their use. It is therefore, necessary to find suitable means to protect the fibers.

One approach to the above problems has been to start with a plurality of optical fibers and to form them into linear arrays packaged in ribbon-like structures. This approach is described in detail in U.S. Pat. No. 4,129,468, issued Dec. 12, 1978. The requirements imposed on such optical fiber ribbons include the need to provide mechanical stripability for ease of cable termination and splicing; the need for small size; the need for resistance to breakage when subjected to tensile stress; the need for individual fiber identification within the ribbon; and, the need to protect the ribbon from distorting forces which may cause deterioration of the optical signal.

After forming these ribbons, they are used to form optical cables. It has been asserted that these ribbons provide adequate protection for the optical fibers when used for information transmission. Various processes for manufacturing such an optical cable are described in U.S. Pat. Nos. 3,937,559; 4,110,001; 4,138,193 and 4,146,302. As appears in each of these patents, it is still necessary to form the ribbon-like structure prior to the cabling operation. Indeed, it is specifically stated in each of these patents that forming of the ribbon-like structure reduces the risk of injury to the optical fibers during the cabling operation. The drawback to such a requirement is particularly significant when a cable having only a few fibers is required. It is an unduly burdensome procedure to first produce ribbons and then make a cable to carry the ribbon. The cabling of the optical fiber ribbons is a complicated and expensive procedure, even after the ribbons have been assembled. Cabling of these ribbons requires the use of planetary stranders at least for the laying of strength members into the required extruded sheath. Such equipment is expensive; and hence, contributes significantly to the overall cost of the cabling operation.

It has been proposed to avoid the requirement for a multistep cabling process by incorporating one or more optical fibers into a cable as the cable was formed. Such procedures are described in U.S. Pat. Nos. 4,155,963; 4,154,049; and 4,205,899. These patents disclose the extrusion of a profiled central member having grooves into which optical fibers are laid, followed by closure of the groove, thereby enclosing the fiber in a longitudinally extending chamber. U.S. Pat. No. 4,199,224 is similar and adds a separate central strength member. These methods permit optical fibers to be laid into the open channels as the cable is manufactured; hence, eliminating the necessity of first manufacturing an optical fiber ribbon. The methods disclosed in these patents require expensive machinery and a large amount of floor space for cabling of optical fiber. As a result of the expenses associated with the machines and dedicated floor space, these are expensive cabling techniques.

Another approach for cabling of optical fibers is disclosed in U.S. Pat. No. 4,153,332 issued May 8, 1979. This patent explains that a cable may be formed by winding unitary elements having an adhering sheath on a supporting core. When this structure is bent on a mandrel having a small bending radius, the unitary element is compressed in the inner portion facing the mandrel and is stretched in the outer portion. This occurs because of the fact that the friction between the element and the core about which it is wound prevents the element from sliding significantly with respect to the core. The optical fiber or fibers contained in the unitary element are subjected to compressive and tension stresses. To overcome this drawback, it is recommended that the fibers be centered in a tubular sheath. This patent discloses that, at the present state of the art, no processes are known for producing unitary optical fiber elements which permit a perfect centering of the optical fiber with respect to the sheath. This is especially true when the sheath has a diameter much greater than that of the fiber. When the fiber is not centered, it is well known to those skilled in the art that the tension or compressive stress on the fiber, when the unitary element is subjected to flexing, is proportional to the distance of the optical fiber from the neutral axis of the unitary element and inversely proportional to the bending radius of the element. To compensate for this, the fibers may be longer than the length of the corresponding surrounding sheath by either winding the fibers around a central core within the sheath or by imparting a helical bend to the fibers and laying them loosely within the sheath. The patent goes on to assert that the provision of a tubular sheath into which the optical fiber is inserted provides a protective structure which shields the surface of the fiber from radial compressive force and from contact with corrosive substances.

Another approach which has been proposed for providing a protective cable structure for optical fibers is disclosed in U.S. Pat. No. 4,235,511 issued Nov. 25, 1980. This patent describes a cabling technique wherein a central strength member is surrounded by elements which define chambers running the length of the strength member and which are covered in order to enclose an optical fiber laid into the chamber. The patent discloses folded splicing tape helically wrapped about the central strength member for formation of the chambers.

All of the above described techniques suffer from one or more of the problems including high expense in cable manufacture, susceptibility to fiber breakage during cabling or cable laying operations, and poor optical transmission characteristics.

SUMMARY OF THE INVENTION

In order to provide a fast, efficient, low cost method of fabricating a cable unit containing optical fibers in a well-protected environment, a stretch member is paid off from a neutralizer payoff in such manner that the strength member is rotating. A tape having longitudinal grooves is paid off from a fixed payoff and passed through a forming die. The strength member is passed through the forming die, and the tape is applied to the exterior of the strength member. As a result of the rotation of the strength member, the tape obtains a helical lay about the strength member. An optical fiber is paid off from a neutralizer payoff and laid into a groove on said tape. In the cable unit so formed, the optical fiber lays in the groove in the tape. Such a groove is preferably formed by folding the tape. If more than one fiber is to be used, the tape may be folded into a corrugated shape. In this manner, a plurality of grooves may be provided in the tape and one or more optical fibers may be laid into each groove. Since the tape is helically laid about the central strength member, the optical fibers then have a helical lay as well, thereby reducing the risk of stress-related loss in the fibers. Additional reduction in fiber stress is obtained as a result of the twist provided to the fibers when paid off from their neutralizer payoffs. This twist compensates for stresses which would otherwise be encountered when the fibers are helically wound about the strength member. In order to provide additional protection for the optical fibers, an outer tape may be helically laid over the corrugated tape in order to cover the fibers. This tape may also be corrugated. Filling compound may be utilized in the manufacture of this cable, and it may be applied under and over the grooves of the corrugated tape. A binder may be provided in order to secure the outer tape over the fiber. This is deemed unnecessary if the cable unit is not to be combined with other cable units to form a composite high fiber count cable.

BRIEF DESCRIPTION OF THE DRAWING

FIG. 1 illustrates an arrangement for manufacturing an optical fiber cable unit according to the invention.

FIGS. 1a and 1b show the overlap of the corrugated tape disclosed with regard to the invention.

FIG. 2 is a cross-section of a portion of the folded spacing tape covered with an outer tape.

FIG. 3 is a cross-sectional view of an optical fiber cable unit made in accordance with the invention.

DETAILED DESCRIPTION OF THE INVENTION

Referring to FIG. 1, the axial strength member 11 is paid off from a supply reel in such a way that it experiences no torsional stress. This can be accomplished by feeding the member 11 from conventional apparatus known as a neutralizer payoff 22. Rotation is imparted to strength member 11 as a result of the rotational motion imparted by the take-up reel of the type known as a single twist closer 21. A corrugated or folded splicing tape 12 is paid off from fixed payoff 23, that is, a reel rotating about a fixed axis, and directed to a tape forming die 29. The strength member 11 and tape 12 are passed through the forming die 29 wherein the tape is folded about the strength member. As a result of the rotation of the strength member 11, the tape 12 assumes a helical lay about the strength member.

Optical fibers 13 are paid off from supply reels such as neutralizer payoffs 25a, 25b so that they, too, do not experience any torsional stress. Plate 28, a part of the tape forming die 29, includes a plurality of guide means, for instance, holes that direct the fibers 13 to a closing die 30. As the strength member, with tape applied, proceeds through the closing die, the fibers 13 are laid into longitudinal grooves in the tape 12. Filling compound may optionally be provided about the optical fibers. This is accomplished by filling compound applicator 24 which includes, for instance, a supply tube located in front of the closing die for applying filling compounds about the strength member and grooved tape in order that the optical fiber is laid into a groove which also contains filling compound. Alternatively, filling compound may be applied after the optical fiber is laid into the groove, in which event the filling compound applicator would be downstream of the closing die 30. An outer tape 14 may be supplied from fixed payoff 26 so that this tape is helically laid about the filling compound to close the cable structure. The outer tape is also wrapped in a helix, and it will tend to hold its position without necessity for providing a binder. A binder, i.e., an additional jacket, may, however, be provided if desired. It is preferred to include a binder if the fiber optic cable unit is intended for use as a component in a large fiber count composite cable including more than one of the above-described optical fiber cable units. The cable unit so manufactured is now wound on the reel of the single twist closer 21.

FIG. 2 shows a cross-section of a portion of the corrugated or folded splicing tape 12 covered with the outer tape 14. The corrugated or folded splicing tape 12 has a plurality of grooves 10, 10a, 10b. Optical fibers 13a, 13b may be laid into the grooves as described above. As may be seen, the size of the fiber is such that the fiber does not extend above the top of the groove, thereby permitting outer tape 14 to cover the groove without compressing or even touching the fiber. Groove 10 contains a plastic coated optical fiber 13a while groove 10a contains a plurality of optical fibers 13b, which fibers are of small size relative to the cross-sectional area contained within the groove. Filling compound 101 is illustrated in grooves 10 and 10b. It is anticipated that in use, filling compound would fill either all grooves or no grooves, but is so illustrated to demonstrate this option without requiring an additional figure. FIG. 3 is a cross-section of the optical fiber cable unit. The axial strength member 11 may be of any material having as its function the improvement of tensile strength in the optical fiber cable unit. Examples of desirable materials include stranded or solid steel wire, extruded plastic, glass material having high tensile strength, or high strength polymeric material. Surrounding the central strength member 11 is the corrugated tape 12 having the plurality of grooves 10. The tape can be of any material with the use of MYLAR being preferred. The depth of the grooves is greater than the diameter of the fiber 13 in order that the top of the groove extends radially in the cable unit structure farther than the exterior portion of the fiber. Such an arrangement permits the outer tape 14 to be applied directly over the corrugate tape without making contact with the optical fiber. In a preferred embodiment, the depth of the groove is sufficient so as to allow a plurality of optical fibers 13a to lie within the groove. If desired, filling compound 101a may be applied between the strength member 11 and the corrugated tape 12. Additionally, filling compound 101b may be applied between the corrugated tape 12 and the outer tape 14.

Referring again to FIG. 1, it is desirable to dimension the tape 12 and pay it off such that the corrugation of the tape 12 along one helical lap about the strength member 11 will interlock with the corrugation of the tape as it makes its next helical lap. This feature is illustrated in FIGS. 1a and 1b where the first lap 12b is partially overlaid by the second lap 12a in the overlap region 12c.

The cable is collected on the single twist closer and stored. If desired, additional outer protective members may be applied such as a thermoplastic extruded jacket of, for instance, polyethylene or a metal armoring and/or rodent and fire protection.

While the present invention has been described with regard to many particulars, it is to be understood that equivalents may be readily substituted without departing from the scope of the invention.

I claim:

1. A method of manufacturing an optical fiber cable unit comprising the steps of:
    paying off an axial strength member such that said strength member rotates;
    paying off a corrugated tape; applying said tape to said rotating strength member so that said tape is helically wrapped about said strength member and so that the corrugations form helical grooves;
    paying off an optical fiber and laying said fiber in a helical groove formed by the corrugations; and
    winding the cable on a reel.

2. The method as claimed in claim 1 further comprising the step of:
    applying filling compound to said groove.

3. The method as claimed in claim 1 further comprising the step of:
    applying filling compound about said strength member before said tape is applied.

4. The method as claimed in claim 1 further comprising the step of:
    applying an outer tape around said corrugated tape after said fiber is laid in said groove.

5. The method as claimed in claim 4 further comprising the step of:
    providing a binder to secure said outer tape.

6. The method as claimed in claim 1 wherein:
    a plurality of optical fibers are paid off and laid in said grooves.

7. The method as claimed in claim 6 wherein:
    not more than one fiber is laid in any one groove.

8. The method as claimed in claim 6 further comprising the steps of:
    applying filling compound to said grooves.

9. The method as claimed in claim 6 further comprising the step of:
    applying filling compound about said strength member before said corrugated tape is applied.

10. The method as claimed in claim 6 further comprising the step of:
    applying an outer tape over said corrugated tape after said optical fiber is laid in said groove.

11. The method as claimed in claim 10 further comprising the step of:
    providing a binder to secure said outer tape.

* * * * *